United States Patent Office 3,117,914
Patented Jan. 14, 1964

3,117,914
NUCLEAR FUEL MATERIALS
William James Keith Wright, Wantage, and Jack Williams, Abingdon, England, assignors to The United Kingdom Atomic Energy Authority, London, England
No Drawing. Filed Dec. 5, 1957, Ser. No. 700,743
Claims priority, application Great Britain Dec. 5, 1956
3 Claims. (Cl. 176—69)

The invention relates to improved nuclear fuel materials comprising cermets of a fissile metal oxide and a metal or alloy.

A cermet consists of an intimate mixture of a ceramic material and a metallic material, the ceramic material preferably being a refractory compound such as a metal oxide.

Cermets of a fissile metal oxide in a non-fissile metal or alloy are well known, and a series of such cermets comprising uranium dioxide have been described by Weber and Hirsch in Paper No. P561 of the Geneva Conference on the Peaceful Uses of Atomic Energy, which paper was published at the conference in August 1955. Such cermets have the advantages over purely ceramic fissile materials of improved thermal conductivity, ease of fabrication, bondability to metal sheathing materials, resistance to penetration and leaching by water, and radiation stability. The use of a ferrous metal such as mild steel or stainless steel as the metallic component of the cermet has the added advantages of cheapness, known fabrication techniques, and good resistance to corrosion by water. The use of a ferrous or other metal, however, may introduce comparatively high neutron absorption capacity into the cermet, which is a disadvantage when the cermet is to be used as nuclear fuel.

According to the present invention, substantial amounts of alumina are introduced into nuclear fuel cermets comprising a fissile metal oxide and a non-fissile metal or alloy. Examples of said fissile metal oxide include uranium dioxide and plutonium dioxide.

It has been found, for example, that about half the volume of the cermet may consist of ceramic components, namely uranium dioxide, plutonium dioxide, or alumina, the remainder being metal or alloy, without reducing substantially the good mechanical and thermal properties and other advantages of the cermet.

A nuclear fuel material according to the invention consists of a cermet in which the ceramic material comprises a mixture of fissle metal oxide and alumina and the metallic material is a ferrous metal, said ceramic material comprising not more than 50% by volume of the cermet. More particularly, the said ferrous metal may be mild steel, stainless steel or unalloyed iron. It is advantageous to enclose the nuclear fuel material within a sheath of said ferrous metal, but the scope of the invention is not limited by the employment of such a sheath.

One embodiment of the invention, and a preferred method by which it may be produced, will be described in the following example:

*Example*

A nuclear fuel material was prepared by mixing intimately together 50 parts per volume of Swedish sponge iron powder (—240 mesh), 40 parts by volume of powdered alumina (—20+60 mesh), and 10 parts by volume of powdered uranium dioxide (—100+200 mesh). The uranium dioxide had a density of 10.55 g./cc. (96% of theoretical). The mixed powders were then placed in a hole bored centrally in a mild steel cylinder about 10 inches long and 3.78 inches in diameter and cold compacted in layers to a density 60 to 70% of theoretical. The cylinder was sealed with a mild steel plug fitting into the bore and arc welded in position. A small vent hole through the weld was provided to allow escape of air during heating and fabrication. The cylinder was then heated in a gas fired furnace to 1200° C. and transferred to the container of an extrusion press for immediate extrusion. Using a graphite and grease lubricant the cylinder was extruded through a tungsten-steel die having a leading face of 130° included angle (25° half angle). The maximum extrusion load was limited to 700 tons giving a ram speed of 6 to 8 inches per second. The cross-sectional area reduction factor was 14. The cylinder extruded easily, the core of nuclear fuel material being maintained centrally within a mild steel sheath. The density of the core was found to be 98 to 99% of theoretical (6.80 g./cc., based on a uranium dioxide particle density of 10.55 g./cc.) The bond between the core and sheath was very good, a solid state weld being obtained. The extruded material could be swaged at 800° C. with up to 60% reduction in area without breaking the bond. The core of the extruded material could be formed, turned, and otherwise machined as a metallic material, had high resistance to mechanical and thermal shock, and had a corrosion rate in high pressure water at 300° C. of only about 1 mg./sq. cm./day.

Other nuclear fuel materials can be prepared and fabricated in a similar way to the above example, comprising smaller proportions of ceramic phase (fissile metal oxide and alumina) and different proportions of fissile metal oxide in the ceramic phase. It has been found that the volume of total ceramic phase may be as much as 50% of the fuel material without adversely affecting many of the useful properties of the material.

In certain conditions in which the nuclear fuel material may be used, it may be advantageous to employ as the ferrous metal in the cermet and the sheath an alloy of greater corrosion resistance than mild steel, e.g., stainless steel.

We claim:

1. As a nuclear fuel material, a cermet comprising a ferrous metal as continuous phase, particles of a fissile metal oxide substantially uniformly dispersed in said ferrous metal, and particles of alumina substantially uniformly dispersed in said ferrous metal, the total of said particles of fissile metal oxide and of alumina being not more than 50% by volume of said cermet.

2. A nuclear fuel material according to claim 1 wherein said fissile metal oxide is uranium dioxide.

3. A nuclear fuel material as claimed in claim 1, enclosed in a sheath of ferrous metal.

References Cited in the file of this patent

UNITED STATES PATENTS

| | | |
|---|---|---|
| 2,805,473 | Handwerk et al. | Sept. 10, 1957 |
| 2,837,428 | Brown | June 3, 1958 |
| 2,848,324 | Krapf | Aug. 19, 1958 |
| 2,852,460 | Abbott et al. | Sept. 16, 1958 |

OTHER REFERENCES

TID–7530 (PT–1), October 1956, pp. 106–108.
International Conf. on Peaceful Uses of Atomic Enegry, vol. 9, pp. 196–201, 1956.
WAPD–MRP–67, February 1957, pp. 58–59.
KAPL–1879, September 16, 1957.
ORNL–2312, October 1957.